(12) United States Patent
Baccouche et al.

(10) Patent No.: US 7,341,299 B1
(45) Date of Patent: Mar. 11, 2008

(54) DOUBLE CELL CRUSHABLE JOINT FOR AUTOMOTIVE FRONT END

(75) Inventors: Ridha Baccouche, Ann Arbor, MI (US); Tim Mouch, Troy, MI (US); Michael Azzouz, Livonia, MI (US); Parameswararao Pothuraju, Canton, MI (US); Viktor Kostrominov, Merrillville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/516,438

(22) Filed: Sep. 6, 2006

(51) Int. Cl.
*B62D 27/02* (2006.01)

(52) U.S. Cl. .................... 296/30; 296/203.02

(58) Field of Classification Search ........... 296/29, 296/30, 187.03, 187.09, 193.01, 203.01, 296/203.02, 205
See application file for complete search history.

(56) References Cited

U.S. PATENT DOCUMENTS

| | | | | |
|---|---|---|---|---|
| 2,045,166 | A * | 6/1936 | Robinson et al. ........ | 296/182.1 |
| 4,684,151 | A * | 8/1987 | Drewek ................. | 280/784 |
| 5,033,593 | A * | 7/1991 | Kazuhito ............... | 188/377 |
| 5,106,148 | A * | 4/1992 | Ikeda et al. ............ | 296/203.02 |
| 5,332,281 | A * | 7/1994 | Janotik et al. .......... | 296/209 |
| 5,597,198 | A * | 1/1997 | Takanishi et al. ....... | 296/193.09 |
| 6,053,564 | A * | 4/2000 | Kamata et al. .......... | 296/187.09 |
| 6,092,865 | A * | 7/2000 | Jaekel et al. ........... | 296/205 |
| 6,227,321 | B1 * | 5/2001 | Frascaroli et al. ....... | 180/68.4 |
| 6,293,617 | B1 * | 9/2001 | Sukegawa .............. | 296/203.03 |
| 6,299,237 | B1 * | 10/2001 | Benz et al. ............ | 296/187.09 |
| 6,302,478 | B1 | 10/2001 | Jaekel ................. | 296/205 |
| 6,327,823 | B1 * | 12/2001 | Emms .................. | 52/93.2 |
| 6,412,857 | B2 | 7/2002 | Jaekel ................. | 296/205 |
| 6,533,347 | B2 * | 3/2003 | Sanada ................ | 296/203.02 |
| 6,616,217 | B1 * | 9/2003 | Robinson .............. | 296/178 |
| 6,695,393 | B1 | 2/2004 | Aouadi ................ | 296/189 |
| 6,811,212 | B2 | 11/2004 | Kasuga ................ | 296/205 |
| 6,814,400 | B2 * | 11/2004 | Henderson et al. ...... | 296/193.09 |
| 6,824,204 | B2 * | 11/2004 | Gabbianelli et al. ..... | 296/205 |
| 6,938,948 | B1 | 9/2005 | Cornell ................ | 296/187.09 |
| 7,066,533 | B2 * | 6/2006 | Sohmshetty et al. ..... | 296/203.02 |

(Continued)

FOREIGN PATENT DOCUMENTS

EP 336781 A * 10/1989 ............. 296/29

(Continued)

*Primary Examiner*—Dennis H. Pedder
*Assistant Examiner*—Paul A Chenevert
(74) *Attorney, Agent, or Firm*—Frederick Owens; Miller Law Group, PLLC

(57) ABSTRACT

A structural joint is formed between the upper frame rail, which bends downwardly to define a generally vertically extending portion, and a generally fore-and-aft extending lower frame rail that can increase bending resistance without sacrificing crash energy management of the horn section of the lower frame rail. The structural joint is reinforced with a crushable tubular reinforcement member formed in a clamshell configuration that includes a forwardly extending support arm positioned beneath the horn section to lower the center of gravity of a downwardly angled horn section to prevent premature bending thereof when encountering crash energy from a frontal impact. The horn section is formed in a pre-folded configuration to enhance the crash energy management of the horn section. The tubular reinforcement provides a double cell structural configuration adjacent the structural joint to provide a crushable structural joint that enables an effective management of crash energy.

15 Claims, 3 Drawing Sheets

U.S. PATENT DOCUMENTS

| | | | |
|---|---|---|---|
| 7,147,275 B2 * | 12/2006 | Matsuyama et al. | 296/203.02 |
| 7,185,724 B2 * | 3/2007 | Dupuis et al. | 180/68.5 |
| 7,210,733 B2 * | 5/2007 | Mouch et al. | 296/203.02 |
| 7,243,986 B2 * | 7/2007 | Dupuis et al. | 296/205 |
| 7,267,394 B1 * | 9/2007 | Mouch et al. | 296/203.02 |
| 7,281,757 B2 * | 10/2007 | Dupuis et al. | 296/205 |
| 2007/0215402 A1 * | 9/2007 | Sasaki et al. | 180/232 |

FOREIGN PATENT DOCUMENTS

| | | | | |
|---|---|---|---|---|
| JP | 63215468 A | * | 9/1988 | 296/29 |
| JP | 03213473 A | * | 9/1991 | 296/203.01 |

* cited by examiner

DOUBLE CELL CRUSHABLE JOINT FOR AUTOMOTIVE FRONT END

FIELD OF THE INVENTION

This invention relates generally to the frame structure of an automotive vehicle and, more particularly, to a frame configuration for the connection of a two crossing beam members forming a part of the front end structure of an automobile.

BACKGROUND OF THE INVENTION

The front end structure of an automotive vehicle is designed to provide visual appeal to the vehicle owner while functioning as an energy absorbing structure during frontal and offset crashes. The size, shape and construction of the front end structure contribute to the ability of the front end structure to attenuate the crash pulse and restrict intrusions into the operator's cabin of the vehicle. It is important to design a front end structure to absorb crash energy through the frame components. To that extent, a significant amount of effort by vehicle engineers is devoted to designing the vehicle frame to crush in a controlled manner while absorbing a maximum amount of energy.

One of the goals in the design of vehicle frame structure is to provide better engagement and absorption of energy during a collision. The major components in absorbing energy in frontal as well as rear impacts are the rails. Furthermore, in a side collision if the vehicle has a softer front end it can help mitigate the injuries to occupants in both vehicles. If there is an apparatus to absorb more energy and prolong the time to crush the rails, the crash pulse and intrusion into the passenger compartment can be reduced significantly.

Vehicle frames typically include an upper rail and a generally vertically spaced lower rail. Preferably, the upper rail joins the lower rail, such as at the forwardmost portion of the vehicle frame, to define an integrally connected automotive frame structure. The structural joint connection between the vehicular upper and lower structural member is conventionally designed as a solid connection which provided good structural integrity in all directions. While the formation of the upper and lower rail members is preferably accomplished through hydroforming techniques which forms the upper and lower rails as tubular members, the upper and lower rails can be formed of any material or any construction technique, including stamped and roll formed vehicular body structures.

The package constraint for the placement and design of the front rail system can present a problem with respect to the energy management function of the front end. In automotive frame configurations in which the package constraint forces the rail to bend downwardly as the horn section approaches the bumper beam, which will allow the automotive frame to meet a 16-20 inch bumper height requirement, a front impact exerts an offset eccentricity between the center of gravity at the bumper and the center of gravity of the subframe attachment. This offset eccentricity can result in a substantial external applied bending at the center of gravity of the front rail section, which can be a large percentage of the bending capacity of the front rail section. Thus, this external applied bending takes away from the section capability to manage the normal buckling and folding stresses due to axial collapse of the horn section of the lower frame rail member. This eccentricity of the frame configuration can result in a premature downward bending of the horn section at the onset of any axial crash.

One approach to resolving this package and loading constraint problem is to reinforce the rearward half or third of the horn section rail length closest to subframe attachment, at lower side of the section where buckling stresses are highest, resulting in a corresponding increase in the bending capacity of the horn section. Typically, this reinforcement is provided in the form of a vertically oriented flange extending downwardly from the horn section. While this reinforcing flange solution does achieve the desired increase in bending capacity in the horn section of the lower frame rail member, the increased bending capacity penalizes the crushability of the horn section over which this solution is implemented. As a result, the horn section can only effectively crush along the forward half or so of the length of the horn section projecting forwardly of the lower frame rail attachment, thus substantially reducing the crash energy management capability of the automotive frame.

In U.S. Pat. No. 6,695,393, issued to Fadhel Aouadi, et al on Feb. 24, 2004, and assigned to Ford Global Technologies, LLC, the concept of a double cell extruded rail having a horizontal middle wall separating the beam into upper and lower cells is disclosed. This double cell frame rail absorbs kinetic energy from a crash to prevent intrusion into the passenger compartment. U.S. Pat. No. 6,811,212 granted to Tatsuo Kasuga on Nov. 2, 2004, teaches a similar front rail structure with a horizontal central wall separating the beam into upper and lower cells. U.S. Pat. No. 6,302,478, issued on Oct. 16, 2001, and U.S. Pat. No. 6,412,857 issued on Jul. 2, 2002, both being granted to Federico Jaekel, et al, disclose a vehicle space frame including hydroformed tubular members which form a joint by using a pair of spaced wall portions extending around the end of the hydroformed tubular members.

U.S. Pat. No. 6,938,948, granted to Troy Cornell on Sep. 6, 2005, discloses an energy absorbing front frame structure in which engine cradle side rails are attached to the vehicle front end and include a crushable jointure joined by a non-deformable intermediate structure. This configuration allows the vehicle frame to absorb crash energy during frontal impacts to improve passenger safety.

Accordingly, it would be desirable to provide a structural joint between the upper frame rail member and the lower frame rail member that would resist premature bending due to a downward angle imposed on the horn section, while permit a collapsing of the horn section of the lower front rail member along the entire length thereof to effectively manage crash energy loading.

SUMMARY OF THE INVENTION

It is an object of this invention to overcome the aforementioned disadvantages of the known prior art by providing structural joint between the upper and lower frame rails in an automotive frame that will resist premature bending due to a downward angle imposed on the horn section without sacrificing crash energy management.

It is another object of this invention to provide a structural joint between the upper and lower frame rails in an automotive frame that will increase bending capacity while permitting a collapsing of the horn section of the lower front rail member along the entire length thereof to effectively manage crash energy loading.

It is an advantage of this invention that the bending capacity of the lower front rail member is increased.

It is another advantage of this invention that the external applied bending in a downwardly angled horn section of a lower frame rail member is reduced.

It is a feature of this invention that a crushable reinforcement is added to the structural joint between the upper and lower frame rail members.

It is another feature of this invention that the reinforcement is formed as a tubular member that will crush upon impact to enhance the crash energy management of the front rail system.

It is still another advantage of this invention that the reinforcement does not detract from the crushing of the horn section of the lower frame rail member.

It is still another feature of this invention that the reinforcement includes a forwardly projecting support arm that underlies the rearward portion of the horn section to increase resistance to premature bending upon impact.

It is still another advantage of this invention that the stiffness of the structural joint between the upper and lower frame rails is increased.

It is yet another feature of this invention that the reinforcement is formed in a clamshell configuration.

It is yet another advantage of this invention that the support arm presents a double cell crushable structure that enhances crash energy management.

It is yet another feature of this invention that the horn section of the lower frame rail member is formed in a pre-folded configuration to direct the collapsing of the horn section upon incurring impact forces.

It is yet another advantage of this invention that the crash energy management of the horn section of the lower frame rail member is enhanced.

It is still another feature of this invention that the crushable reinforcement shifts the center of gravity of the front rail system to prevent premature bending of the horn section in impact situations.

It is a further object of this invention to provide a structural joint between the upper and lower frame rail members in an automotive frame that will increase bending capacity without sacrificing crash energy management effectiveness, which is durable in construction, inexpensive of manufacture, carefree of maintenance, facile in assemblage, and simple and effective in use.

These and other objects, features and advantages are accomplished according to the instant invention by providing a structural joint between the upper frame rail, which bends downwardly to define a generally vertically extending portion, and a generally fore-and-aft extending lower frame rail that can increase bending resistance without sacrificing crash energy management of the horn section of the lower frame rail. The structural joint is reinforced with a crushable tubular reinforcement member formed in a clamshell configuration that includes a forwardly extending support arm positioned beneath the horn section to lower the center of gravity of a downwardly angled horn section to prevent premature bending thereof when encountering crash energy from a frontal impact. The horn section is formed in a pre-folded configuration to enhance the crash energy management of the horn section. The tubular reinforcement provides a double cell structural configuration adjacent the structural joint to provide a crushable structural joint that enables an effective management of crash energy.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
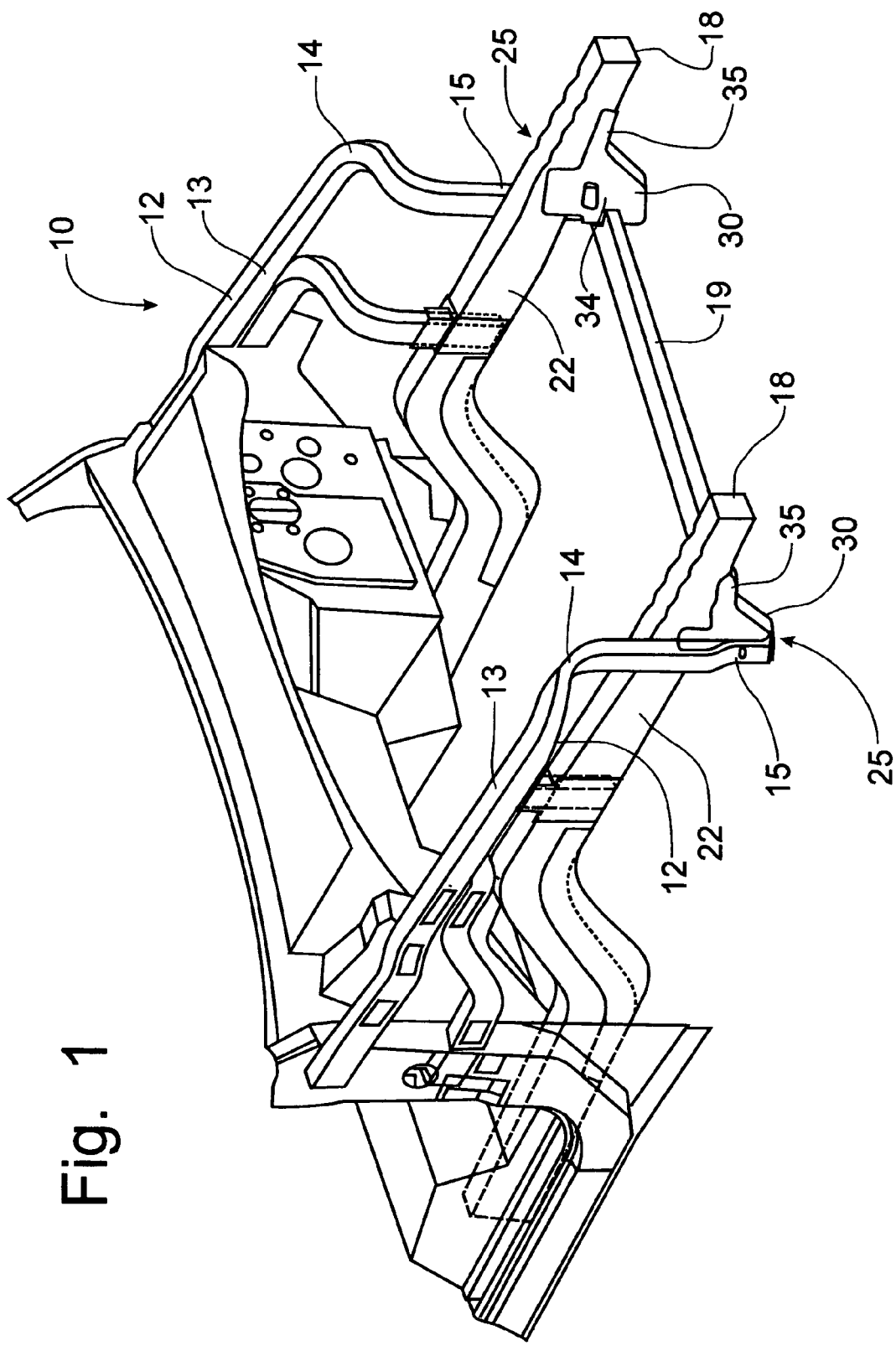
FIG. 1 is a perspective view of the front portion of an automotive frame incorporating the principles of the instant invention.
Figure 2:
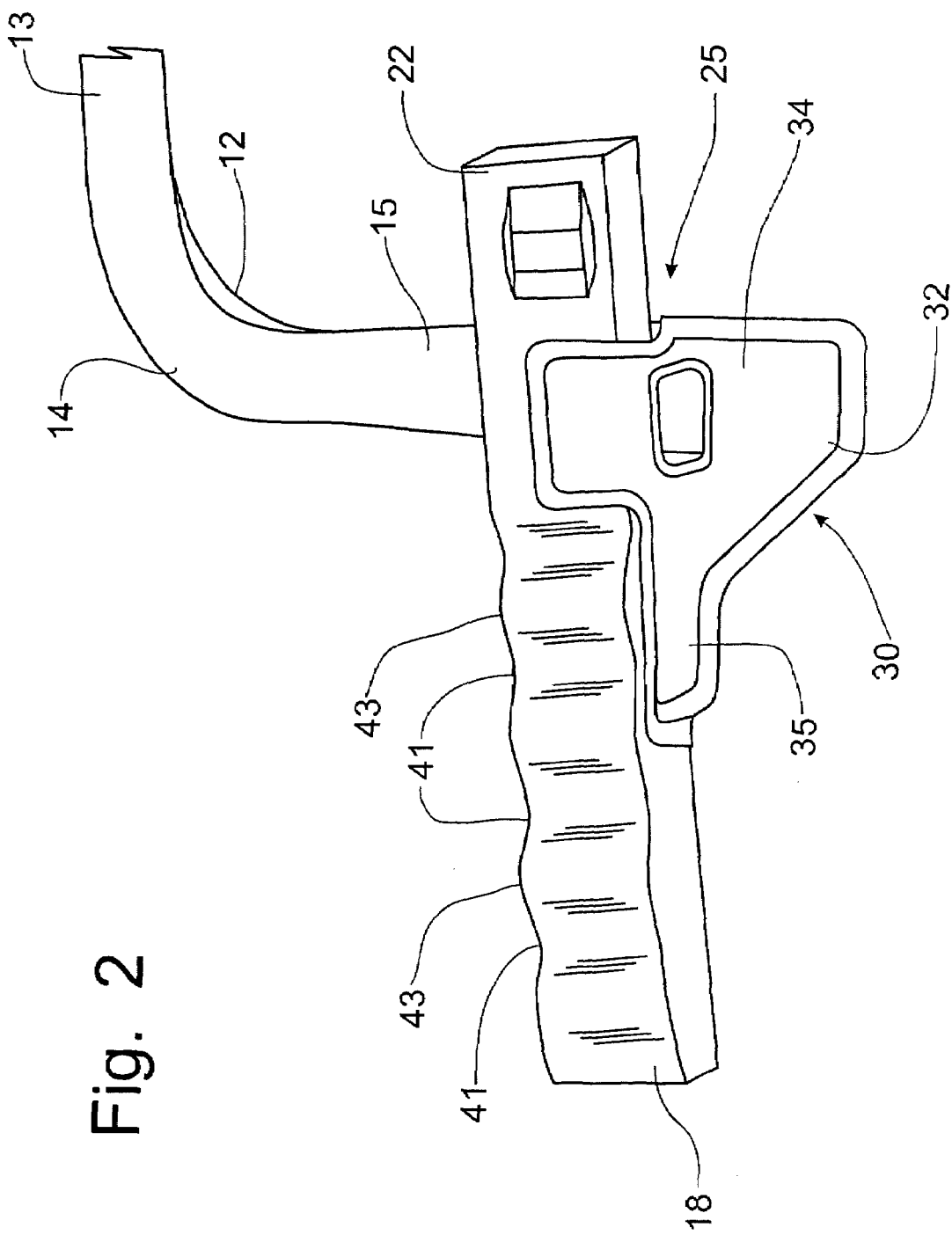
FIG. 2 is an enlarged partial side elevational view of the structural joint between the vertically extending portion of the upper frame rail member and the longitudinally extending lower frame rail member, looking at the inner side of the structural joint.
Figure 3:
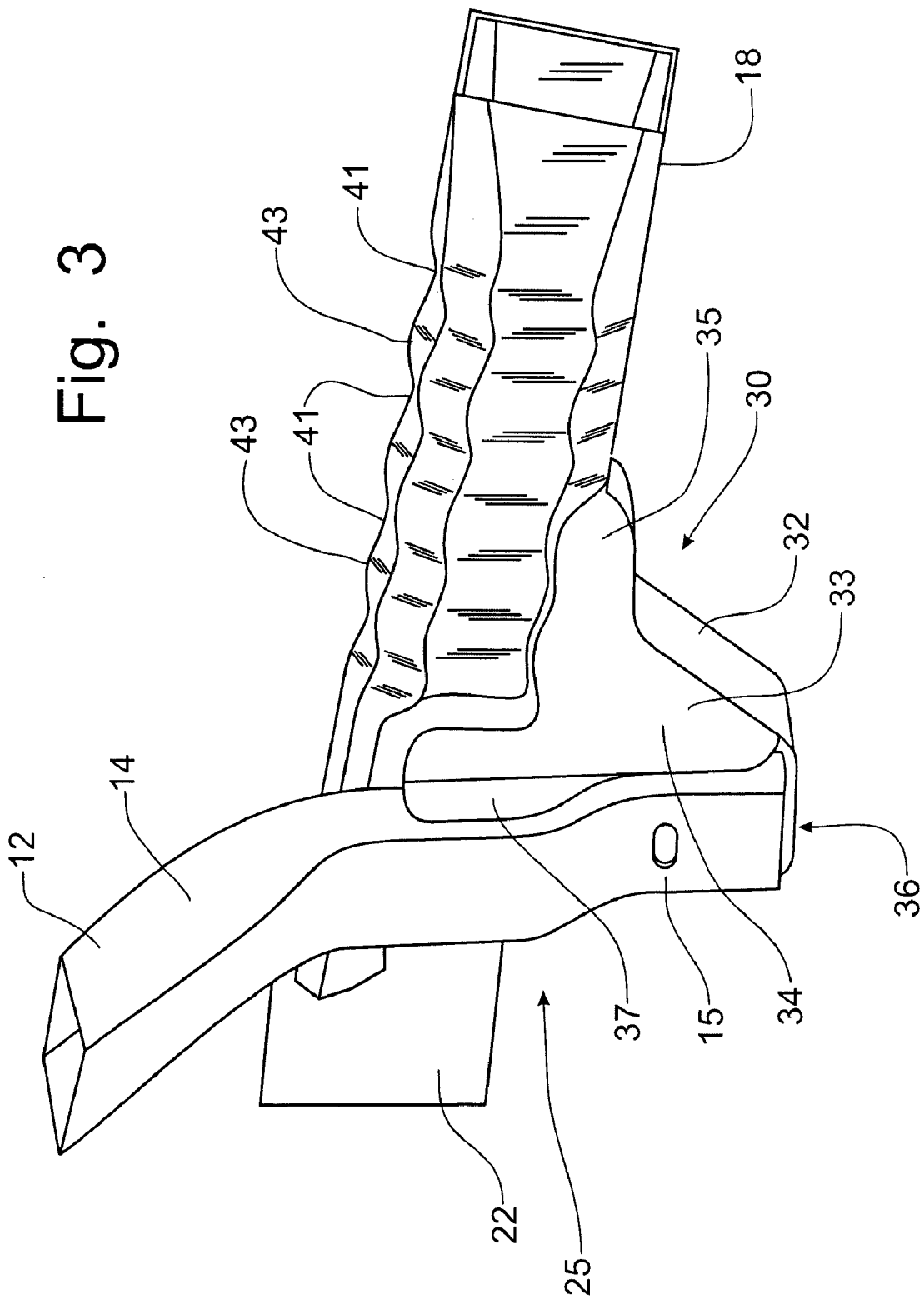
FIG. 3 is an enlarged partial perspective view of the structural joint between the vertically extending portion of the upper frame rail member and the longitudinally extending lower frame rail member, looking at the outer side of the structural joint.

Referring to FIGS. 1-3, a structural joint between two primary components of an automotive frame incorporating the principles of the instant invention can best be seen. The two primary members of the automotive frame 10 are the upper frame rail 12 and the lower frame rail 22. The upper frame rail 12 includes a generally horizontally extending portion 13 that is located at the upper outside portion of the automobile on both respective sides thereof. The upper frame rail 12 then preferably bends through a bend portion 14 inwardly and downwardly to form a generally vertically extending portion 15 that passes outboard of the lower frame rail 22. A radiator support member 19 is connected to the laterally opposing, vertically extending portions 15 of the upper frame rail 12 to extend transversely across the front of the automotive frame 10. The lower frame rail 22 extends forwardly of the vertically extending portion 15 of the upper frame rail 12 to form the horn section 18 to which the bumper (not shown) is traditionally mounted.

The horn section 18 of the lower frame rail 22 projects forwardly of the vertically extending portion 15 of the upper frame rail member 12 in a cantilevered manner to position the bumper (not shown) at the forward extremity of the vehicle and to start the management of crash energy by crushing rearwardly when encountering crash energy from an impact. After collapsing the horn sections 18, the impact forces encounter the structural joint 25 between the upper frame rail 12 and the lower frame rail 22. In situations where the horn sections 18 are angled downwardly from the structural joint 25, the horn sections 18 are subjected to a premature downward bending because of the offset eccentricity of the applied bending forces to the center of gravity of the horn section 18. In such situations, the horn sections 18 do not effectively manage the crash forces and subject the structural joint 25 to a greater exposure of crash energy.

To lower the center of gravity of the horn section 18 and remove the offset eccentricity of the downwardly angled horn section 18, the structural joint 25 is formed with a tubular reinforcement member 30 that is formed in a clamshell configuration with an inner member 32 configured to receive a nesting outer member 33. Welded together, the inner and outer members 32, 33 form a tubular body portion 34 that includes a forwardly extending support arm 35 that is positioned beneath the horn section 18 immediately forwardly of the vertically extending portion 15 of the upper frame rail member 12. Preferably, the support arm 35 is welded to the horn section 18. The body portion 34 also forms a pocket 36 that receives the end of the vertically extending portion 15 of the upper frame rail member 12. The outer member 33 is preferably formed with a welding flange 37 that bends outwardly to mate against the upper frame rail member 12 and facilitate the welding therebetween.

The horn section 18 is formed in a pre-folded configuration to enhance the crushing of the horn member 18 when encountering crash forces. The pre-folded configuration is defined by the convoluted surface of the horn member 18 to alternatively increase and reduce the effective cross section of the horn member 18. The convolutions form valleys 41 that reduce the cross-section of the horn section 18 between the ridges 43 that increase the cross-section of the horn section 18. Accordingly, the horn section 18 will collapse uniformly at the valleys 41 and expand outwardly at the ridges 43 when crash energy from an impact is encountered by the horn sections 18.

Once the crash energy reaches the rearward portion of the horn sections 18, the support arm 35 of the reinforcement member 30 acts as a second cell to increase the effectiveness of the horn section 18 to manage crash forces. If necessary, the welding between the vertically extending portion 15 of the upper frame rail member 12 and the lower frame rail member 22 along with the reinforcement member 30, particularly the welding flange 37 of the outer member 33, can be designed to break away upon encountering a sufficient crash force and direct the flow of crash energy as desired along the flow paths corresponding to the upper and lower frame rail members 12, 22.

The tubular configuration of the reinforcement member 30 provides a crushable reinforcement for the horn section 18 of the lower frame rail member 22, which does not detract from the effective management of crash energy by the horn sections 18. In fact, the double cell configuration of the horn section 18 coupled with the support arm 35 of the reinforcement bracket 30 increases the effectiveness of crash energy management. Furthermore, the forwardly extending support arm 35 lowers the center of gravity of a downwardly angled horn section 18 to provide a substantially increase resistance to bending forces to allow the horn sections 18 to collapse as intended. Even though the reinforcement members 30 increase the bending resistance of the horn section, the crushable tubular configuration of the reinforcement members 30 do not detract from the desired crushing of the horn sections 18.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, the preferred configuration of the reinforcement member 30 is a two-piece clamshell construction having an inner member 32 and an outer member 33 received within the inner member 32. The reinforcement member 30 could instead be a one-piece tubular member formed through a hydroform manufacturing process. In the alternative, the reinforcement member 30 could be formed with the inner member 32 incorporating a tubular support arm 35 with the outer member 33 received within the inner member 32 behind the support arm 35. Any of these configurations, as well as other embodiments, would provide a crushable reinforcement member 30 that would increase the bending capacity of the horn section 18 without departing from the crushability of the horn section and the associated efficient management of crash energy.

What is claimed is:

1. A structural joint in an automotive frame, comprising:
a first frame member having a vertically extending portion;
a second frame member having a longitudinally extending portion located adjacent to the vertically extending portion of the first primary frame member, the second frame member including a projecting portion extending longitudinally from the first frame member; and
a tubular reinforcement member having a body portion engaged with the first and second frame members and a longitudinally extending support arm positioned below the projecting portion of the second frame member, said support arm being attached to the projecting portion of the second frame member to lower the center of gravity of the projecting portion.

2. The structural joint of claim 1 wherein the body portion of the reinforcement member forms a pocket into which the vertically extending portion of the first frame member is positioned.

3. The structural joint of claim 2 wherein the reinforcement member is formed as a one-piece tubular member.

4. The structural joint of claim 2 wherein the projecting portion of the second frame member is formed in a prefolded configuration having a convoluted surface defining valleys and ridges oriented transversely to the longitudinally extending projecting portion.

5. The structural joint of claim 4 wherein the reinforcement member is formed in a clamshell configuration with a first member forming one lateral side of the reinforcement member and a second member forming an opposing lateral side of the reinforcement member and being received within the first member.

6. The structural joint of claim 5 wherein the first member is an upper frame rail and said second frame member is a lower frame rail, the projecting portion being a horn section extending in a cantilevered manner from the connection of the lower frame rail to the upper frame rail, the horn section being utilized to mount a bumper.

7. The structural joint of claim 6 wherein the second member is formed with a welding flange that bends laterally away from the body portion for engagement with the upper frame rail.

8. In an automotive frame having an upper frame rail including a horizontally extending portion, a vertically extending portion and a bend portion interconnecting the horizontally and vertically extending portions; and a longitudinally extending lower frame rail spaced vertically below the upper frame rail, the vertically extending portion of the upper frame rail being located adjacent to the lower frame rail, the lower frame rail including a forwardly projecting horn section extending in a cantilevered manner from a structural joint between the vertically extending portion of the upper frame rail and the lower frame rail, the improvement comprising:
the horn section being formed in a prefolded configuration having a convoluted surface defining valleys and ridges oriented transversely to the longitudinally extending horn section; and
a tubular reinforcement member having a body portion engaged with the vertically extending portion of the upper frame rail and the lower frame rail, and a longitudinally extending support arm positioned below the horn section of the lower frame rail, the reinforcement member being formed in a clamshell configuration with a first member forming one lateral side of the reinforcement member and a second member forming an opposing lateral side of the reinforcement member and being received within the first member.

9. The automotive frame of claim 8 wherein the reinforcement member is formed as a one-piece tubular member formed through a hydroform manufacturing process.

10. The automotive frame of claim 8 wherein the second member is formed with a welding flange that bends laterally away from the body portion for engagement with the upper frame rail.

11. The automotive frame of claim 10 wherein the body portion of the reinforcement member forms a pocket into which the vertically extending portion of the upper frame rail is positioned.

12. The automotive frame of claim 11 wherein the support arm is welded to the horn section to lower the center of gravity of the horn section.

13. An automotive frame comprising:
- an upper frame rail including a horizontally extending portion, a vertically extending portion and a bend portion interconnecting the horizontally and vertically extending portions;
- a longitudinally extending lower frame rail spaced vertically below the upper frame rail, the vertically extending portion of the upper frame rail being located adjacent to the lower frame rail, the lower frame rail including a forwardly projecting horn section extending in a cantilevered manner from a structural joint between the vertically extending portion of the upper frame rail and the lower frame rail;
- the horn section being formed in a prefolded configuration having a convoluted surface defining valleys and ridges oriented transversely to the longitudinally extending horn section; and
- a tubular reinforcement member having a body portion engaged with the vertically extending portion of the upper frame rail and the lower frame rail, and a longitudinally extending support arm welded to the underside of the horn section of the lower frame rail to lower the center of gravity of the horn section, the reinforcement member being formed in a clamshell configuration with an inner member forming one lateral side of the reinforcement member and an outer member forming an opposing lateral side of the reinforcement member and being received within the inner member.

14. The automotive frame of claim 13 wherein the inner member of the reinforcement member forms a pocket into which the vertically extending portion of the upper frame rail is positioned, the outer member including a welding flange that bends laterally away from the body portion for engagement with the upper frame rail to secure the upper frame rail between the inner member and the welding flange of the outer member.

15. The method of claim 13 wherein the reinforcement member is formed as a one-piece tubular member formed through a hydroform manufacturing process.

* * * * *